US 8,005,899 B2

(12) United States Patent
Cunningham

(10) Patent No.: US 8,005,899 B2
(45) Date of Patent: Aug. 23, 2011

(54) SYSTEM AND METHOD FOR DETECTING AND FILTERING UNSOLICITED AND UNDESIRED ELECTRONIC MESSAGES

(75) Inventor: Brian D. Cunningham, Powhatan, VA (US)

(73) Assignee: Message Level LLC, Richmond, VA (US)

( * ) Notice: Subject to any disclaimer, the term of this patent is extended or adjusted under 35 U.S.C. 154(b) by 1262 days.

(21) Appl. No.: 10/803,120

(22) Filed: Mar. 17, 2004

(65) Prior Publication Data
US 2005/0210106 A1 Sep. 22, 2005

Related U.S. Application Data

(60) Provisional application No. 60/455,940, filed on Mar. 19, 2003.

(51) Int. Cl.
*G06F 15/16* (2006.01)
(52) U.S. Cl. ...................................... 709/206
(58) Field of Classification Search ................. 709/206, 709/207
See application file for complete search history.

(56) References Cited

U.S. PATENT DOCUMENTS

| | | | |
|---|---|---|---|
| 5,748,735 A | 5/1998 | Ganesan | |
| 5,878,136 A | 3/1999 | Kim et al. | |
| 5,884,033 A | 3/1999 | Duvall | |
| 5,999,932 A | 12/1999 | Paul | |
| 6,112,227 A | 8/2000 | Heiner | |
| 6,199,102 B1 | 3/2001 | Cobb | |
| 6,249,805 B1 | 6/2001 | Fleming | |
| 6,289,451 B1 | 9/2001 | Dice | |
| 6,321,267 B1 | 11/2001 | Donaldson | |
| 6,343,361 B1 | 1/2002 | Nendell et al. | |
| 6,393,465 B2 | 5/2002 | Leeds | |
| 6,421,709 B1 | 7/2002 | McCormick et al. | |
| 6,460,050 B1 | 10/2002 | Pace et al. | |
| 6,539,430 B1 | 3/2003 | Humes | |
| 6,546,416 B1 | 4/2003 | Kirsch | |
| 6,609,196 B1 | 8/2003 | Dickinson | |
| 6,691,156 B1 | 2/2004 | Drummond et al. | |
| 6,782,516 B2 | 8/2004 | Rittman et al. | |
| 6,865,681 B2 | 3/2005 | Nuutinen | |

(Continued)

FOREIGN PATENT DOCUMENTS
WO WO 0110090 A1 * 2/2001
(Continued)

OTHER PUBLICATIONS

Curtin, Matt. "Recommendations for generating Message IDs", Jul. 1998, p. 1-5.*

(Continued)

*Primary Examiner* — Andrew Caldwell
*Assistant Examiner* — Ryan Jakovac
(74) *Attorney, Agent, or Firm* — Thomas & Karceski, PC

(57) ABSTRACT

A sending device locates and stores identifying information for each electronic message sent by the device. A receiving device, upon receipt of an electronic message, locates identifying information for the electronic message and the purported sending device of the message. The receiving device communicates a confirmation request to the purported sending device which contains identifying information for the message. The sending device receives confirmation messages and replies to such messages confirming that the message was sent if identifying information in the confirmation request corresponds to identifying information stored by the sending device and denying that the message was sent if the identifying information in the confirmation request does not correspond to stored data.

56 Claims, 4 Drawing Sheets

U.S. PATENT DOCUMENTS

| | | | |
|---|---|---|---|
| 6,986,049 B2 | 1/2006 | Delany | |
| 7,039,949 B2 | 5/2006 | Cartmell et al. | |
| 7,134,012 B2 | 11/2006 | Doyle et al. | |
| 7,249,175 B1 | 7/2007 | Donaldson | |
| 7,290,033 B1* | 10/2007 | Goldman et al. | 709/206 |
| 2002/0029279 A1 | 3/2002 | Campbell et al. | |
| 2002/0046250 A1* | 4/2002 | Nassiri | 709/206 |
| 2002/0059454 A1 | 5/2002 | Barrett et al. | |
| 2002/0129236 A1 | 9/2002 | Nuutinen | |
| 2002/0143710 A1 | 10/2002 | Liu | |
| 2002/0144154 A1* | 10/2002 | Tomkow | 713/201 |
| 2002/0181703 A1 | 12/2002 | Logan et al. | |
| 2002/0198950 A1 | 12/2002 | Leeds | |
| 2003/0009698 A1 | 1/2003 | Lindeman et al. | |
| 2003/0043853 A1 | 3/2003 | Doyle | |
| 2003/0065941 A1 | 4/2003 | Ballard et al. | |
| 2003/0070096 A1 | 4/2003 | Pazi et al. | |
| 2003/0149733 A1* | 8/2003 | Capiel | 709/206 |
| 2003/0167311 A1* | 9/2003 | Kirsch | 709/206 |
| 2003/0182379 A1* | 9/2003 | Henry | 709/206 |
| 2003/0187942 A1* | 10/2003 | Quine et al. | 709/207 |
| 2003/0191799 A1* | 10/2003 | Araujo et al. | 709/203 |
| 2003/0191969 A1 | 10/2003 | Katsikas | |
| 2003/0220978 A1* | 11/2003 | Rhodes | 709/206 |
| 2003/0236847 A1 | 12/2003 | Benowitz | |
| 2004/0003283 A1* | 1/2004 | Goodman et al. | 713/201 |
| 2004/0015554 A1* | 1/2004 | Wilson | 709/206 |
| 2004/0143740 A1 | 7/2004 | Tsai | |
| 2004/0148358 A1* | 7/2004 | Singh et al. | 709/207 |
| 2004/0181571 A1 | 9/2004 | Atkinson et al. | |
| 2004/0230657 A1* | 11/2004 | Tomkow | 709/206 |
| 2004/0236838 A1 | 11/2004 | Tout | |
| 2004/0249901 A1* | 12/2004 | Wallace et al. | 709/207 |
| 2004/0260778 A1* | 12/2004 | Banister et al. | 709/206 |
| 2005/0015455 A1* | 1/2005 | Liu | 709/207 |
| 2005/0044156 A1 | 2/2005 | Kaminski et al. | |
| 2005/0055410 A1* | 3/2005 | Landsman et al. | 709/206 |
| 2005/0076090 A1* | 4/2005 | Thuerk | 709/207 |
| 2005/0076220 A1* | 4/2005 | Zhang et al. | 713/176 |
| 2005/0114516 A1* | 5/2005 | Smith et al. | 709/227 |
| 2005/0144239 A1* | 6/2005 | Mattathil | 709/206 |
| 2005/0172004 A1* | 8/2005 | Fisher | 709/206 |
| 2005/0188045 A1* | 8/2005 | Katsikas | 709/206 |
| 2005/0188077 A1* | 8/2005 | Quintanilla et al. | 709/224 |
| 2005/0198158 A1* | 9/2005 | Fabre et al. | 709/206 |
| 2005/0198173 A1* | 9/2005 | Evans | 709/206 |
| 2005/0198511 A1 | 9/2005 | Tomkow | |
| 2005/0210106 A1 | 9/2005 | Cunningham | |
| 2005/0251861 A1 | 11/2005 | Cunningham | |
| 2006/0031315 A1 | 2/2006 | Fenton | |
| 2007/0208941 A1* | 9/2007 | Backer | 713/170 |

FOREIGN PATENT DOCUMENTS

| | | |
|---|---|---|
| WO | WO 2007/021260 A1 | 2/2007 |
| WO | WO 2007/021261 | 2/2007 |
| WO | WO 2007/030742 | 3/2007 |
| WO | WO 2007/037925 | 4/2007 |
| WO | WO 2007/038090 | 4/2007 |

OTHER PUBLICATIONS

Bill McInnis, Re: [Asrg] Death, taxes and E-Postage, http://www.ietf.org/mail-archive/web/asrg/current/msg09864.html, Apr. 28, 2004.

Email Spoofing and Phishing Finally Has a Solution, Press Release, Jul. 29, 2004.

MessageLevel Added to IMail Server, http://www.thewhir.com/marketwatch/mes101304.cfm, Web Host Industry Review, Inc., Oct. 13, 2004.

Anti-Phising Through Sent E-mail Verifications, Press Release, http://products.datamation.com/security/anti-spam/1097682917.html, Oct. 13, 2004.

MessageLevel.com Archive, http://web.archive.org/web/*/http://www.messagelevel.com, Jul. 3, 2004-Nov. 30, 2004.

Brian Cunningham et al., Message Level Authentication Protocol—Overview Document, www.messagelevel.com, Nov. 17, 2004.

RFC2821, "Simple Mail Transfer Protocol," The Internet Society, Apr. 2001, pp. 1-79.

RFC2822, "Internet Message Format," The Internet Society, Apr. 2001, pp. 1-51.

Supplemental Search Report EP 05784143.9 dated Aug. 21, 2009, 8 pgs.

International Search Report and Written Opinion of International Searching Authority dated Nov. 18, 2005 for International Application No. PCT/US05/28510; 8 pgs.

Office Action issued Sep. 11, 2009 in Chinese Application No. 200580051709.3, 18 pgs.

International Search Report issued Jun. 14, 2006 in PCT/US05/28509.

Supplemental Search Report EP 05784288.2 dated Aug. 21, 2009, 8 pgs.

* cited by examiner

SYSTEM AND METHOD FOR DETECTING AND FILTERING UNSOLICITED AND UNDESIRED ELECTRONIC MESSAGES

CROSS-REFERENCE TO RELATED APPLICATIONS

This application claims priority from U.S. Provisional Application 60/455,940, filed Mar. 19, 2003 "Anti-spoofing SPAM inhibitor ("ASSI")."

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention relates to a system and a method for detecting and filtering unsolicited and undesired electronic messages by automatically verifying that the purported originator of the electronic message actually sent the message.

DESCRIPTION OF THE RELATED ART

Electronic communication is an essential tool in facilitating both business and personal communication. One form of electronic messaging, email, offers several advantages over traditional forms of communication. Email allows for the almost instantaneous exchange of information, it allows for the transmission of multiple messages at very little cost and it permits the transfer of large data files from one sender to another user. Nonetheless, the inherent nature of email gives rise to certain disadvantages. Most notable, and a topic of critical concern, is the increasing proliferation of unwanted and unsolicited email or "Spam."

Spam is unsolicited email that is typically transmitted to an extremely large number of email recipients. Spam is the electronic equivalent to "junk mail" received by traditional mail service. Generally, a Spam email is a commercial advertisement attempting to sell a product or service. Spam typically directs the recipient to take some action in order to purchase the product or service being advertised. This may be in the form of offering a phone number or a hyperlink in the text of the spam message which, when utilized by the recipient will place the recipient in contact with the seller of the goods or services. Spam is often, although not exclusively, utilized by entities marketing products or services outside the norm of traditional retailers and service providers. Some Spam messages contain information or graphics unsuitable for email users, particularly those who are children. However, Spam offers tremendous marketing benefits as it allows a retailer, marketer, or other sender to reach an incredibly large audience with a minimal economic expenditure.

Unfortunately, this benefit to the sender of Spam comes at a considerable cost to the unwilling recipients of Spam messages. Spamming costs companies millions of dollars in congested servers, expenses incurred employing measures to block the Spam email, and lost productivity due to email recipients having to wade through large amounts of Spam solicitations in order to find desired email. Further, Spam email provides an ideal medium for computer hackers to infect users' systems through the introduction of computer viruses and other malicious code.

Persons who desire to send Spam email are able to obtain email lists in a variety of ways. For example, email lists can be compiled from email addresses appearing on existing emails received by the sender or from users who provide their email address during electronic transactions. Additionally, lists of addresses are often compiled by third parties and sold in the same manner that traditional address lists have been sold.

According to one estimate, as of January 2004, Spam email constituted as much as 60% of all email traffic on the Internet ("Microsoft Sets Its Sights on Defeating Spam," National Public Radio, *Morning Edition*, Feb. 2, 2004). As Spam has become more plentiful, there has arisen a great demand for an effective and efficient method which will detect and block delivery of these unsolicited messages.

Spam email, like all email, originates from a Sending Email System. All electronic messages, including Spam email messages, contain various data elements in a header, an envelope or another designated portion of the electronic message that facilitate transfer of the message. These include, most especially, the addresses of the intended recipients of the message, the address of the originator of the message and the date and time when the message was prepared. For example, under Internet standard RFC 2821, "Simple Mail Transfer Protocol," the message envelope of an email contains various data elements including an originator address and one or more recipient addresses. Similarly, under standard RFC 2822, "Internet Message Format" an internet message header for an email must contain an origination date and an originator address and typically includes a destination address field.

An email address, whether an originator or a recipient address, typically takes the form of "user@domain name." For either originator or recipient addresses, the domain name portion of the email address identifies the host system to which or from which email is sent or received. The "user" portion of the address identifies the specified user and is assigned by the host system which, in the case of an originator address, transmits emails prepared by the specified user or, in the case of a recipient address, receives email messages for the specified user.

A host system sending an email transfers email to an intended recipient by referencing the Domain Name System ("DNS"). When the sending host system receives a prepared email message, it first identifies the domain name for each of the intended recipients. Through processes well known to those schooled in the art, the sending host system then utilizes the Domain Name System ("DNS") to determine the Internet Protocol (IP) address of the host system associated with each of the domain names in each of the recipient email addresses.

Next, the sending host system communicates with each host system associated with an intended recipient utilizing an email transfer protocol. For example, RFC 2821, "Simple Mail Transfer Protocol," ("SMTP") describes one protocol typically used for the transfer of electronic messages.

Although a sending host system could communicate with a receiving host system over any one of the more than 65,000 communication ports available to either system, by convention email transmissions are typically conducted through one or more designated ports. For example, the Internet Assigned Numbers Authority ("IANA") has designated communication ports numbered 0 through 1023 as System or Well Known Ports and further designated port 25 for Simple Mail Transfer. See http://www.iana.org/numbers.html. Accordingly, by convention most SMTP processes are conducted by electronic communications between a sending host system's port 25 and a receiving host system's port 25.

Where a host system comprises a plurality of email servers servicing a single domain name, the DNS system provides one or more IP addresses for access to any of the servers. Thus, where a receiving email system may receive messages by a plurality of email servers, any sender querying the DNS system will receive the same unique IP address or set of unique IP addresses for the domain name. When an email or other electronic communication is made to the IP address, the receiving email system, through processes well known to those schooled in the art directs the transmission to the appropriate server within the receiving system.

DNS data may be stored at the individual client machine level as well as at the host system level. Additionally, DNS name servers are available through the Internet for inquiries that cannot be satisfied at the client machine or host system level.

As noted earlier, one data element customarily included in an email message is the email address from which the email originated. For example, an email user who prepared a message conforming to RFC 2822 would include an originating email address in the "From:" email header field such as "From: user@domain.com" in which "domain.com" is the domain name from which the message originated. Optionally, an originating email address, including a domain name, may appear in the "Sender:" email header field.

One partially effective method of blocking Spam messages known by those schooled in the art is for a Receiving Email System to identify the domains from which Spam is known to originate and then to block any future emails which are sent with originating email addresses that have that same domain name. A Receiving Email System simply compiles a list of the domain names which have sent Spam messages. This list, or "blacklist," is thereafter, referenced by the Receiving Email System whenever an email is received. If the email originated from a domain name on the blacklist, the message is blocked from delivery.

Those skilled in the art will recognize that the inverse of this technique can be, and has, also been implemented. That is, a Receiving Email System may compile a list of trusted domain names, or a "whitelist." Thereafter, whenever a message is received by the Receiving Email System the whitelist is referenced. If the message originated from a domain name on the whitelist, the message is delivered.

Many Receiving Email Systems employ both whitelists and blacklists. If the source domain is recognized as a trusted system because it is listed on the whitelist, the email is delivered. If it is not, the Receiving Email System references a blacklist to determine whether the source has been identified as a source of Spam email and refuses delivery if it has been so identified.

Several services, such as SpamCop and MAPS, have been formed to compile, maintain and share the domain data of known spamming domains. These services allow Receiving Email Systems to reference large databases of known sources of Spam email compiled from many sources so that the Receiving Email System participating in the service may exclude email originating from a domain known to be a source of Spam email. This method of filtering unsolicited email has been implemented at both the user level, the Receiving Email System level, as well as the Internet Service Providers (ISP) level. As a matter of reference, it is estimated that ISP America On-Line blocks almost 2 billion messages per day from identified spamming systems.

However, an increasing amount of Spam is bypassing blacklist measures and capitalizing on whitelists by "spoofing" itself as having originated from legitimate domains. Spoofing occurs when a spamming system provides a false originating email address as a data element in the email or the email envelope. The domain name of the false address may be a legitimate domain name, such as "aol.com," "hotmail.com," or "msn.com," or it may be a fictitious domain name. Spammers falsify or "spoof" the originating email address in a Spam message in order to bypass blacklists that are blocking Spam and to hide their actual identity from Receiving Email Systems. Because there is a plethora of legitimate domain names from which legitimate email might originate, a spamming system utilizing spoofing has an almost unlimited ability to conceal its identity from Receiving Email Systems by frequently changing the domain name which it falsely provides as the source of the Spam messages being sent. As a matter of reference, it has been estimated that 70% of all Spam contains a spoofed originating email address.

Spoofing further compromises the ability of a Receiving Email System to use blacklists or whitelists to block Spam because of the potential for blocking legitimate and desired email transmissions. For example, a spammer may configure the spamming email system to send out Spam with an originating email address in the message header that identifies "hotmail.com" as the domain name from which the Spam email originated. In such a circumstance, email systems which receive these Spam messages and which utilize blacklists are faced with a dilemma. Although they could block all emails originating from the hotmail.com domain, this would have the undesirable effect of also blocking all non-Spam, desired emails coming from hotmail.com users.

Accordingly, if a Receiving Email System relies upon blacklists and whitelists only to block Spam it must either deliver spoofed Spam email or deny delivery of a significant amount of desired email. The first shortcoming occurs when a Spammer spoofs a domain name which exists on the Receiving Email System's trusted domain name list, that is, its whitelist. The second occurs when the Receiving Email System identifies a domain as a spamming domain and provides the domain data for that domain to a local or centrally maintained blacklist because the domain name was falsely shown as the originating domain for Spam email. Thereafter, when non-Spam email is originated from the domain and transmitted to the same Receiving Email System or to another Receiving Email System which references the same blacklist, the non-Spam email will be blocked.

The spoofing problem is further exacerbated by the inability of system administrators to identify all potential domain names from which non-Spam email might originate. Therefore, it has become increasingly difficult for system administrators to avoid blocking legitimate email while simultaneously stopping "spoofed" Spam because they cannot blacklist and block domain names that are heavily utilized by legitimate email senders and because they cannot be certain that some desired email will not be blocked if they add a previously unidentified spamming domain name to a blacklist.

One method for identifying Spam which has been spoofed is to compare the IP address of the Sending Email System transmitting the suspect email message with the IP address assigned to the domain name identified in the originator's email address. Customarily, when a Sending Email System transmits an email message, the Sending Email System identifies itself to the Receiving Email System during the transmission connection. For example, under RFC 2821, Simple Mail Transfer Protocol, the "Hello" command is used by the Sending Email System to identify itself to the Receiving Email System and the command line includes the domain name of the Sending Email System. One way, therefore, to determine whether a spoofed email is being transmitted is to determine the IP address of the domain name in the "Hello" command from DNS and to determine the IP address of the domain name for the domain name provided in the email address of the originator as set forth in the email or the email envelope. If the two IP addresses are the same, then the email message is presumptively non-Spam. However, if the two IP addresses are different, then the email is presumptively determined to be Spam.

This method, commonly referred to as "reverse MX record look-up" is somewhat effective in identifying Spam. However, where a spammer spoofs both the origination address provided in the email headers and envelopes, but also the domain name for the Sending Email System during the SMTP communication transaction, this method fails. Thus, a sophisticated spoofer may provide a false origination address that includes a valid domain name and also provide a false Sending Email System domain name or a false Sending Email System IP address during the SMTP transaction ensuring, however, that the false origination address and the false Sending Email System domain name or IP address are consistent. In this way, the spoofer may avoid detection of the Spam email by those administrators employing reverse MX record look-up.

Another method for identifying Spam which has been spoofed that is taught in the prior art is to analyze portions of the email message itself to determine whether the message is Spam. According to this method, suspected Spam email is electronically analyzed or "filtered" according to one or more algorithms which assess the content of various portions of the suspected email, including, for example, the subject line, other data elements in the header of the email, the contents of the message itself, or any combination of these.

Several types of these Spam filtering mechanisms are disclosed by the prior art. These systems permit a Receiving Email System to assess email messages to determine if they should be delivered. For example U.S. Pat. No. 5,999,932 (Paul '932) and U.S. Pat. No. 5,884,033 (Duvall '033) disclose varieties of filtering methods.

The Duvall '033 patent discloses a filtering system that, in part, compares portions of received email messages to information in a data system of information typically contained in Spam messages. The Duvall '033 system has the capability to search an email for a particular string of characters, and for a particular orientation of such characters, in order to determine whether a received email message is objectionable and should, therefore, be determined to be Spam.

The Paul '932 patent discloses a Spam filtering method in which multiple steps are performed. First, data from one or more data elements from an incoming email is compared with stored data. If the data properly cross-references, according to pre-determined criteria, the mail is delivered. If not, one or more additional heuristic techniques are executed in order to determine if the email is valid and should be delivered.

Unfortunately, these types of Spam filters suffer from serious drawbacks. Filtering programs typically require substantial processing capacity. Such programs require every suspected Spam message to be parsed and analyzed by the various algorithms employed by the program. Therefore, filtering programs may not be suitable for installation on a single email recipients' computer because the processing capacity of the computer is unlikely to be sufficient to operate the filtering program as well as other applications. However, even if the processing capacity of the Receiving Email System is substantial, it is still likely to be heavily taxed by a filtering program, particularly if the Receiving Email System receives a high volume of email and large number of suspected Spam messages.

Consequently, some organizations have built Filtering Email Systems, separate systems which receive incoming emails and process the email messages using filtering programs or other methods before transmitting them to the Receiving Email System for delivery. Where the utilization of a filtering program is preferred, the use of a Filtering Email System reduces the demand on the system resources of the Receiving Email System that would be encountered if the program was run on the Receiving Email System itself.

Even when a Filtering Email System is used, however, these filtering systems are inefficient and are unable to consistently filter out inappropriate email while permitting the delivery of valid email. This is true because the algorithms utilized, while complex, are not sufficiently sophisticated to fairly and fully analyze and assess message content. Moreover, Spammers can employ techniques, such as using broken words and numeric representations for letters in order to avoid detection by filtering programs. For example, "Viagra" could be entered as "Via gra" or "V1agra" in order to avoid detection.

In an attempt to overcome these drawbacks, Publication No. 2003/0009698 discloses a system for filtering Spam that relies upon the transmission of a "confirmation request" by the Receiving Email System to the purported sender. The confirmation request is a reply email automatically generated by the Receiving Email System in response to any incoming email that does not originate from a whitelisted source or that may be potentially classified as Spam. The reply email requests that the original sender manually acknowledge the confirmation request in order for the sender to become a "trusted source." This method relies on the inability of most spamming systems to respond to reply emails and the virtual impossibility that the spamming system could respond to a large number of them. If the confirmation email cannot be successfully delivered or if the system does not receive a reply to the request, then the Receiving Email System lists the mail as Spam and deletes it. Otherwise, if the Receiving Email System receives a reply, it adds the domain name to a trusted source list, or whitelist, and forwards the message to the intended recipient.

Other patents, such as U.S. Pat. No. 6,199,102 (Cobb '102) disclose similar systems that utilize some form of confirmation return email message. In the case of the Cobb '102 patent, the confirmation email contains a question which must be answered by the sender or requires the sender to perform some other cognitive task that cannot be performed by a computer. If no response or an inappropriate response is received the suspect email is blocked from delivery and deleted.

Although the Cobb '102 invention and the method of Publication No. 2003/0009698 provide advantages over filtering programs, they suffer three significant drawbacks. First, they require the original sender of the email communication to take additional action, that is, to reply to the confirmation message, prior to delivery of the first communication. This creates additional, and typically unexpected and undesired, work on the part of the original sender. Additionally, where the sender is unavailable or unwilling to send a reply, delivery of the message may be delayed or denied. Second, these methods typically deliver, without requiring sender confirmation, any email messages which have originated from whitelisted domain names. Thus, if a Spammer spoofs a domain name which is listed on the whitelist utilized by a Receiving Email System employing one of these methods, the Spam email will be delivered without requiring a sender confirmation message. Finally, these challenge email methods require a second email delivery, typically sent to the message originator which could itself prompt the preparation of a challenge email and so on, leading to a cascade of emails. Even if this cascade is pre-empted by some programmed interruption, however, the employment of this method still leads to a substantial increase in email traffic.

The method and system disclosed by U.S. Pat. No. 6,393,465 (Leeds '465) attempts to solve the foregoing problems by attaching a secret authorization code to each message. Users of the Leeds '465 system are provided with an authorization code by a third party "overseer." The code is included in all email communications. When a Receiving Email System receives email containing a code that is unrecognized, the Receiving Email System may verify that the email sender is not a spammer by checking with the third party overseer.

While the Leeds '465 system does reduce the strain on Receiving Email Systems, it is fallible because it requires that the secrecy and integrity of the authorization codes be maintained. If a Spammer is able to decipher a participant's authorization code, he can use the code to send Spam email without detection. Further, this system requires authentication by, and repeated communication with, a third-party authenticator. Additionally, users of this system are dependent upon a third party's representations that a particular Sending Email Server is not a spamming system.

There is the need, therefore, for a system and method for the detection and filtering of Spam email that can be performed by Sending and Receiving Email Systems without the intervention of senders or other persons and which does not excessively tax the processing resources of the mail servers. There is also a need for a method to identify Spam email sent by spoofing without blocking non-Spam email from the domain name which has been falsely identified as the origin of the Spam. There is also a need for a method which allows for the identification of Spam email which apparently originates from domain names known to be the origin for many non-Spain email messages without human intervention and without overtaxing the processing resources of Receiving Email Systems. The present invention addresses these needs.

SUMMARY OF THE INVENTION

The present invention provides a system and a method for detecting and filtering undesired electronic messages by automatically verifying that the purported originator of a suspected message actually sent the message, so that unwanted and unsolicited electronic messages, particularly those with false originating address information, may be blocked from delivery.

The invention is a system that can be employed in conjunction with a variety of electronic message delivery and email protocols, including, for example, SMTP and SendMail. The system comprises a software module or Sending Module, which interacts with a device sending electronic messages, that is a Sending System and a second software module or Receiving Module, which interacts with a device receiving electronic messages, that is a Receiving System. The first and second software modules of the invention can be developed and implemented in a variety of programming languages and can be deployed on a variety of electronic systems. The first and second modules comprise the necessary code to perform the functions associated with a Sending System and a Receiving System respectively.

According to the invention, when a Sending System transmits an electronic message for delivery, the Sending Module prepares an Information Record which includes data uniquely identifying the electronic message which is being sent for delivery. Preferably, the Information Record includes the time and date that the message was prepared, data identifying the originator of the message, and data identifying the intended recipients of the message. Optionally, the Information Record may contain additional data related to the electronic message such as a unique message identifier. For example, in the case of an email message, the unique identifier contained in an email header's "Message-ID:" field as recommended by RFC 2822, "Internet Message Format" may be utilized.

Those schooled in the art will recognize that a variety of data elements can be utilized to uniquely identify an electronic message. For example, a checksum of the text of an email message or a portion of the message, or data prepared according to an algorithm applied to the message or a portion of the message could be used as a unique message identifier.

The Information Records for all of the electronic messages sent by the Sending System are stored in a database and organized for efficient retrieval. Preferably, all of the Sending Modules and Receiving Modules in the communication system practicing the invention will, by pre-arrangement, uniquely identify each electronic message by the same data element or set of data elements or by data prepared by the same algorithm.

According to the invention, when a "suspect electronic message" that is, an electronic message which the Receiving System cannot otherwise verify as authentic and desired, is received by a Receiving System, the Receiving Module withholds the suspect message from delivery. Next, the Receiving Module determines the identity of the Sending System from which the suspect message has purportedly been transmitted. This data may ordinarily be ascertained by referencing data in the suspect message, or, alternatively, from data in an envelope accompanying the message or from data transmitted during the transmission of the message. Next, the Receiving Module sends a confirmation request to the Sending System from which the suspect email has purportedly originated.

Those schooled in the art will recognize that, in the case of email messages, a Receiving Module can determine the Internet Protocol (IP) address of the purported Sending Email System by utilizing DNS in the same fashion that a Sending Email System utilizes DNS to determine the IP address for an email that it intends to send. Moreover, those schooled in the art will recognize that, in the event that a suspect email received by the Receiving Email System is a spoofed email, that is an email falsely identifying an originating email address with a domain name other than the system from which the email originated, the IP address provided to the Receiving Module by querying DNS will correspond to the domain name falsely identified as the originator and not the actual source for the email.

The confirmation request from the Receiving Module contains data uniquely identifying the suspect message which, by pre-arrangement, corresponds to the data which a Sending Module in the same communication system would have stored if the message was sent by a Sending System practicing the invention. Preferably, the confirmation request includes the date and time that the suspect electronic message was prepared, the identification of the intended recipients of the message and data identifying the originator of the suspect email. Optionally, the confirmation request may include a unique message identifier.

When a Sending System receives a confirmation request from a Receiving Module, it communicates the confirmation request to the Sending Module. The Sending Module references the database containing Information Records for all of the electronic messages transmitted by the Sending System. If the Sending Module finds an Information Record which was prepared for the suspect message, the Sending Module replies to the confirmation request confirming that the Sending System transmitted the suspect message. If the Sending Module does not find an Information Record which was prepared for the suspect message, the Sending Module replies to the confirmation request denying that the Sending System transmitted the suspect message.

When the Receiving System receives a reply to the confirmation request affirming that the Sending System sent the suspect message, the Receiving Module releases the suspect message for delivery to the intended recipient. When the Receiving System receives a reply to the confirmation request denying that the Sending System sent the suspect message, the Receiving Module destroys the suspect email message or otherwise disposes of it according to the preferences of the administrator of the Receiving System.

Where the invention is practiced by systems transmitting email messages, the confirmation request and the reply to the confirmation request are, preferably, performed by port to port communication between a Receiving Email System and a Sending Email System. For example, the communication may be conducted through one of the Registered Ports, that is, a port in the range 1024 to 49151. Under these circumstances, when a Receiving Module attempts to make a confirmation request of a Sending Email System which has not employed the invention and, therefore, does not have a Sending Module, the Sending Email System will either deny access to the port or fail to respond to the request. If either condition occurs, the Receiving Module can neither affirm not deny that the email is Spam and may, optionally, further analyze the email using other filtering methods or deliver the email with a warning to the recipient that whether the email is Spam could neither be affirmed nor denied.

DETAILED DESCRIPTION OF THE PREFERRED EMBODIMENTS

The present invention provides a system and a method for detecting and filtering undesired electronic messages by automatically verifying that the purported originator of a suspected undesired message actually sent the message, so that unwanted and unsolicited messages, particularly those transmitted with false origination information, may be blocked from delivery. The description provided here is presented to enable one of ordinary skill in the art to make and practice the invention. However, various modifications to the preferred embodiments which are described will be apparent to those skilled in the art. Additionally, although the present invention is described in relation to the detection of Spam email messages, those skilled in the art will appreciate that the system and method described may also be applied to other forms of electronic communication including, for example, text messaging by cellular telephones or voice over Internet Protocol (VoIP) messaging.

Figure 1:
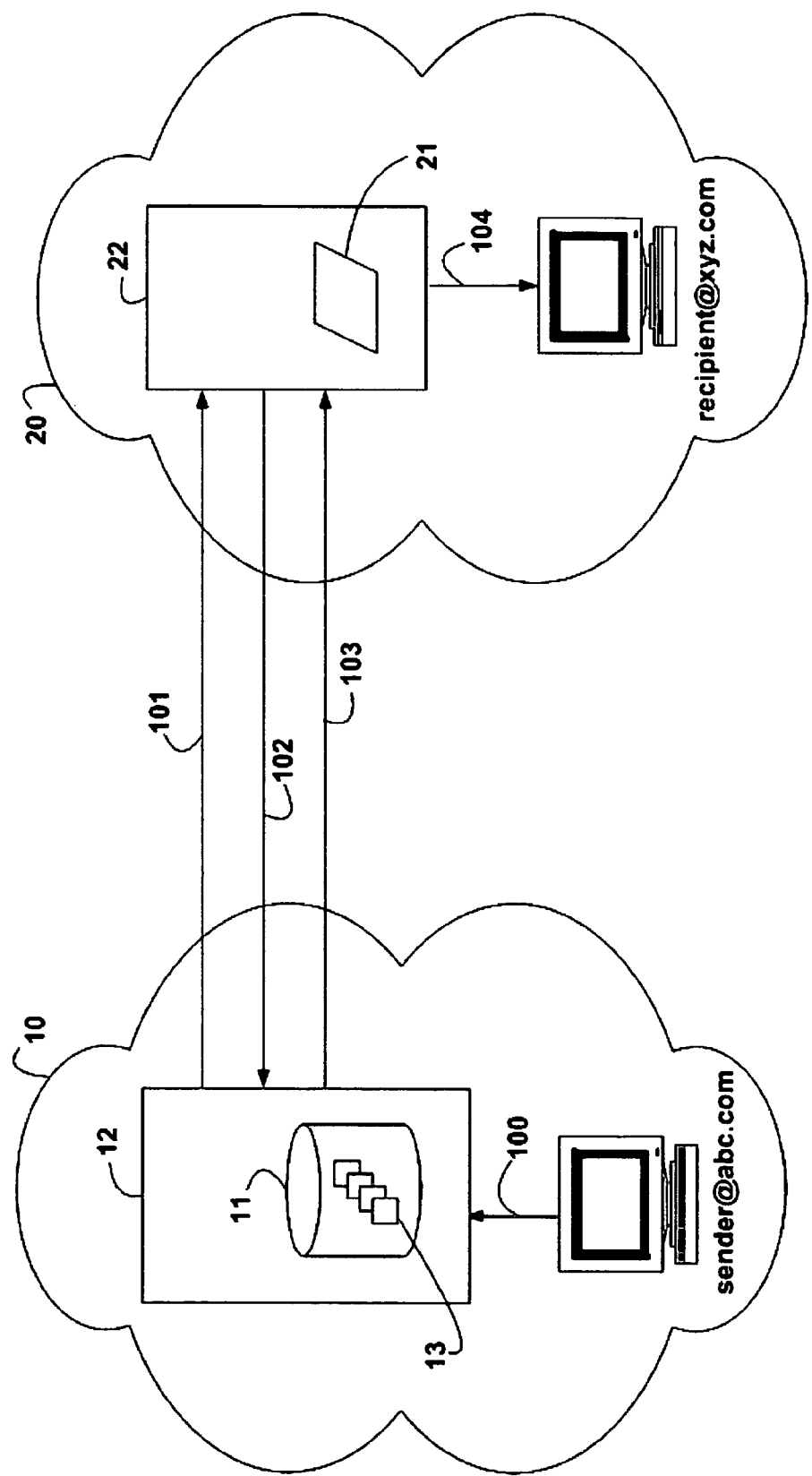
FIG. 1 is a schematic illustration of a Sending Email System and a Receiving Email System processing email according to the invention.

A preferred embodiment of the invention is shown in FIG. 1. A Sending Email System (10) servicing the domain name abc.com is disposed to send email messages prepared by users with email addresses including the domain name abc.com. The Sending Email System (10) is in communication with a Sending Module (12). A Receiving Email System (20) servicing the domain name xyz.com is disposed to receive and deliver email messages to users with email addresses including the domain name xyz.com. The Receiving Email System (20) is in communication with a Receiving Module (22).

Those schooled in the art will recognize that the Sending Email System may consist of a single computer running an email application (for example, Microsoft Outlook), an email server transmitting emails prepared by a plurality of users and serving one or more domain names, a plurality of email servers sending emails prepared by a plurality of users and serving one or more domain names, or a Relay Email System, that is, a system receiving emails from another Sending Email System and forwarding these with or without modification to a Receiving Email System. Similarly, those schooled in the art will recognize that the Receiving Email System may consist of a single computer running an email application, an email server, a plurality of servers, or a Gateway Email System.

Gateway Email Systems include those systems which receive and forward emails to a plurality of Receiving Email Systems and additionally, those which operate to forward messages received in one email transport environment to an email recipient in another email transport environment. For example, a Gateway Email System may operate to receive messages by SMTP and forward them to systems or users receiving messages in SendMail.

While for clarity of description of the invention the receiving and sending functions of each email system have been segregated, those schooled in the art will recognize that the sending and receiving functions may be and ordinarily are performed by a single computer serving as an email server.

Referring to FIG. 1, a Sending Email System (10) receives an email message (100) prepared by user with the email address sender@abc.com to be sent to a recipient with the email address recipient@xyz.com. Consistent with RFC 2822, "Internet Message Format", the sender's email address and the recipients' email address appear in the header portion of the email message at the header fields "From:" and "To" respectively. Additionally and also consistent with RFC 2822, the date and time which the message was prepared is inserted at the header "Date:".

Prior to the transmission of the prepared email message, the Sending Module (12) generates an Information Record (13) containing data uniquely identifying the email being transmitted. Preferably the Information Record (13) includes data contained in the header of the email including the sender's address, the recipient's address and the date and time when the email was prepared. Additionally, an Identification Data String, that is a unique data element, such as a unique alphanumeric identifier, may optionally be generated by the Sending Module (12) and included in the Information Record (13) and in the header or body of the email message being sent. For example, the unique identifier included at the header "Message-ID:" as recommended by RFC 2822 may be used as an Identification Data String. Optionally, other Identification Data Strings, such as a checksum for the message text, may be prepared and stored in the Information Record related to the message.

The Information Record is stored by the Sending Module in an Information Record database (11). The database is organized for efficient search and retrieval of the Information Records. Those schooled in the art will recognize that the Information Record database may be stored on the same computer on which the sending module resides or may optionally be stored externally on a computer in communication with the Sending Module.

The email message is transmitted (101) by the Sending Email System via standard and well-known methods to the Receiving Email System (20) of the intended recipient. When the Receiving Email System (20) receives the email message or the suspect email, the Receiving Module (22) temporary withholds delivery of the suspect email by routing the suspect email into a temporary hold queue (21) while it performs the confirmation process.

During the confirmation process, the Receiving Module (22) first determines the domain name in the originating email address from the message header of the suspect email. Next, the Receiving Module (22) prepares a confirmation request and transmits it (102) to the Sending Email System associated with the domain name identified as the source of the suspect email message. The confirmation request contains identification data which uniquely identifies the suspect email and by pre-arrangement, corresponds to the data which Sending Modules practicing the invention within the communication network use to uniquely identify emails. Preferably this data includes the date and time the suspect email was prepared, the sender's email address, and the addresses of the intended recipients of the email. This information will typically be extracted from the header fields of the suspect email.

Optionally, by pre-arrangement, the email message sent by a Sending Email System (10) contains an Identification Data String used by the Sending Module (12) to identify the email. In this circumstance, the confirmation request sent by the Receiving Email System (20) includes the Identification Data String in addition to other identification data, including, for example, the date and time that the email message was prepared, the email address of the sender of the email and the email addresses of the intended recipients of the email.

When a confirmation request is received by the Sending Email System (10), the Sending Email System communicates the confirmation request to the Sending Module (12). The Sending Module (12) compares the data submitted in the confirmation request with the Information Records stored in its Information Record database (11). When the Sending Module locates an Information Record (13) prepared for the email identified by the identification data submitted in the confirmation request, the Sending Module (12) replies to the confirmation request with an affirmation (103) that the Sending Email System (10) sent the suspect email.

Preferably, where the Sending Email System comprises at least one email server, the Receiving Email System communicates directly with the Sending Email System via port to port communications rather than by email transmission. For example, the communication may, by pre-arrangement between systems practicing the invention in the communications network, be conducted through one of the Registered Ports, that is, a port in the range 1024 to 49151.

Where the Sending Email System comprises a single client computer running an email application and which may be offline, it may be necessary for the Receiving Module to communicate with the Sending Module by specialized email communications. In such a circumstance, the Sending Module, by pre-arrangement with the Receiving Module, may include in the original email message data identifying the original email message as a transmission for which the confirmation request must be conducted by specialized email communication. Additionally, in this circumstance a confirmation request email includes data identifying the confirmation request email as a transmission for which a confirmation request should not be prepared.

When the Receiving Module receives a reply to the confirmation request that affirms that the Sending Email System sent the suspect email, the email is withdrawn from the temporary hold queue (21) and made available for delivery (104) to the recipient at the address recipient@xyz.com by the Receiving Email System (20).

Figure 2:
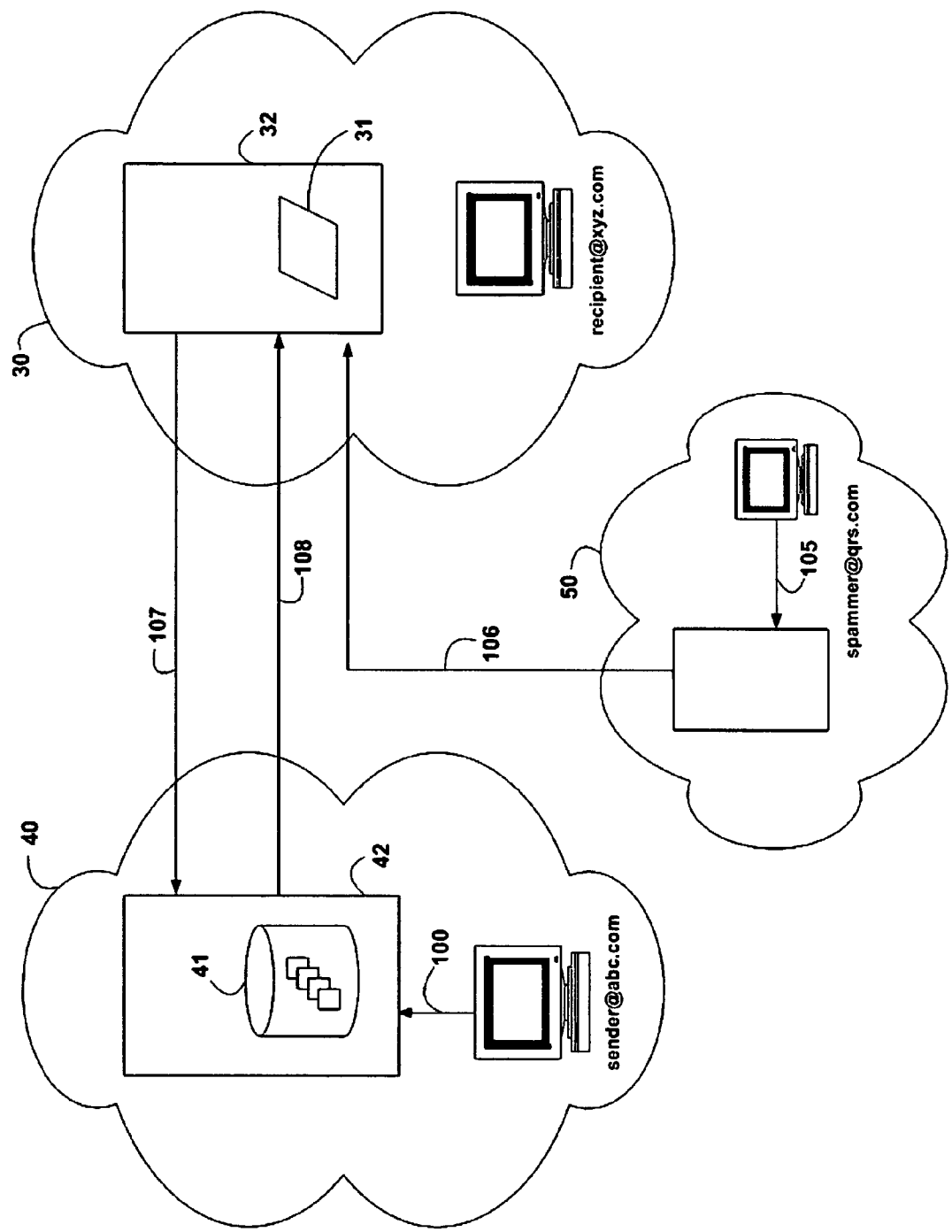
FIG. 2 is a schematic illustration of a Sending Email System and a Receiving Email System processing and filtering a spam email according to the invention.

FIG. 2 illustrates a preferred embodiment of the invention in operation to prevent the delivery of unsolicited and undesired Spam email. A Spamming Email System (50) is disposed to transmit Spam email messages. A Sending Email System (40) servicing the domain name abc.com is disposed to transmit email messages prepared by users with email addresses including the domain name abc.com. The Sending Email System (40) includes a Sending Module (42). The Sending Module comprises an Information Record database (41). A Receiving Email System (30) servicing the domain name xyz.com is disposed to receive and deliver email messages to users with email addresses including the domain name xyz.com. The Receiving Email System (30) includes a Receiving Module (32).

Referring to FIG. 2, a Spammer at email address spammer@qrs.com prepares a Spam email to be sent to recipient at email address recipient@xyz.com and sends it (105) to the Spamming Email System (50). However, in order to avoid detection, Spammer inserts a false origination address, sender@abc.com, in the header of the Spam email message. In addition to the false origination address, the recipients' email address also appears in the header portion of the email message. The Spam email message also contains date and time data inserted by the Spammer at the header field, "Date:".

The Spam email message is transmitted (106) by the Spamming Email System (50) via standard and well-known methods to the Receiving Email System (30) of the intended recipient. When the Receiving Email System (30) receives the Spam email message or the suspect email, the Receiving Module (32) temporary suspends delivery of the suspect email by routing the suspect email into a temporary hold queue (31) while it performs the confirmation process.

During the confirmation process, the Receiving Module (32) first determines the domain name for the purported originating email address from the message header of the suspect email. Because the Spammer has falsely provided sender@abc.com as the originating email address, the Receiving Module (32) will determine that abc.com is the domain name of the originating domain. Next, the Receiving Module (32) prepares a confirmation request and transmits it (107) to the domain, abc.com, identified as the source of the suspect email message. The confirmation request contains data which uniquely identifies the suspect email and which, by pre-arrangement, corresponds to data used by Sending Modules practicing the invention in the communication network to uniquely identify email messages. Preferably this data includes the date and time the suspect email was sent, the sender's email address, and the email address of the intended recipient of the email.

When a confirmation request is received by the Sending Email System (40), the Sending Email System communicates it to the Sending Module (42). The Sending Module (42)

compares the data submitted in the confirmation request with the Information Records stored in its Information Record database (41). When the Sending Module fails to locate an Information Record prepared for the email corresponding to the data submitted in the confirmation request, the Sending Module (42) replies to the confirmation request with a denial (108) that the Sending Email System transmitted the suspect email.

When the Receiving Module receives a reply to the confirmation request that denies that the Sending Email System transmitted the suspect email, the Receiving Module (32) destroys the suspect email message or otherwise disposes of it according to the preferences of the administrator of the Receiving Email System.

In the preferred embodiment of the system which is described, the respective Receiving and Sending Modules communicate with one anther via port to port communications. Where the Sending Email System comprises a single client computer running an email application which may be offline, it may be necessary for the Receiving Module to communicate with the Sending Module by specialized email communications. In such a circumstance, the Sending Module, by pre-arrangement with the Receiving Module, may include in the original email message data identifying the original email message as a transmission for which the confirmation request must be conducted by specialized email communication. Additionally, in this circumstance a confirmation request email includes data identifying the confirmation request email as a transmission for which a confirmation request should not be prepared.

Where the Receiving Module (32) attempts to communicate a confirmation request to a Sending Email System that is not practicing the invention (not shown), the Receiving Module will either be denied access to the port for such confirmation requests or, alternatively, will be granted access but fail to receive an appropriate response from the Sending Email System. When this occurs the Receiving Module may, optionally, release the email for delivery to the intended recipient, may append data to the email informing the recipient that it was unable to confirm or deny that the email was Spam or may process the email according to other Spam detection methods.

Communication between Sending and Receiving Modules may also occur by Secure Sockets Layer protocols and, where additional security is desired, the communications may be encrypted and decrypted according to methodologies commonly known in the art.

Figure 3:
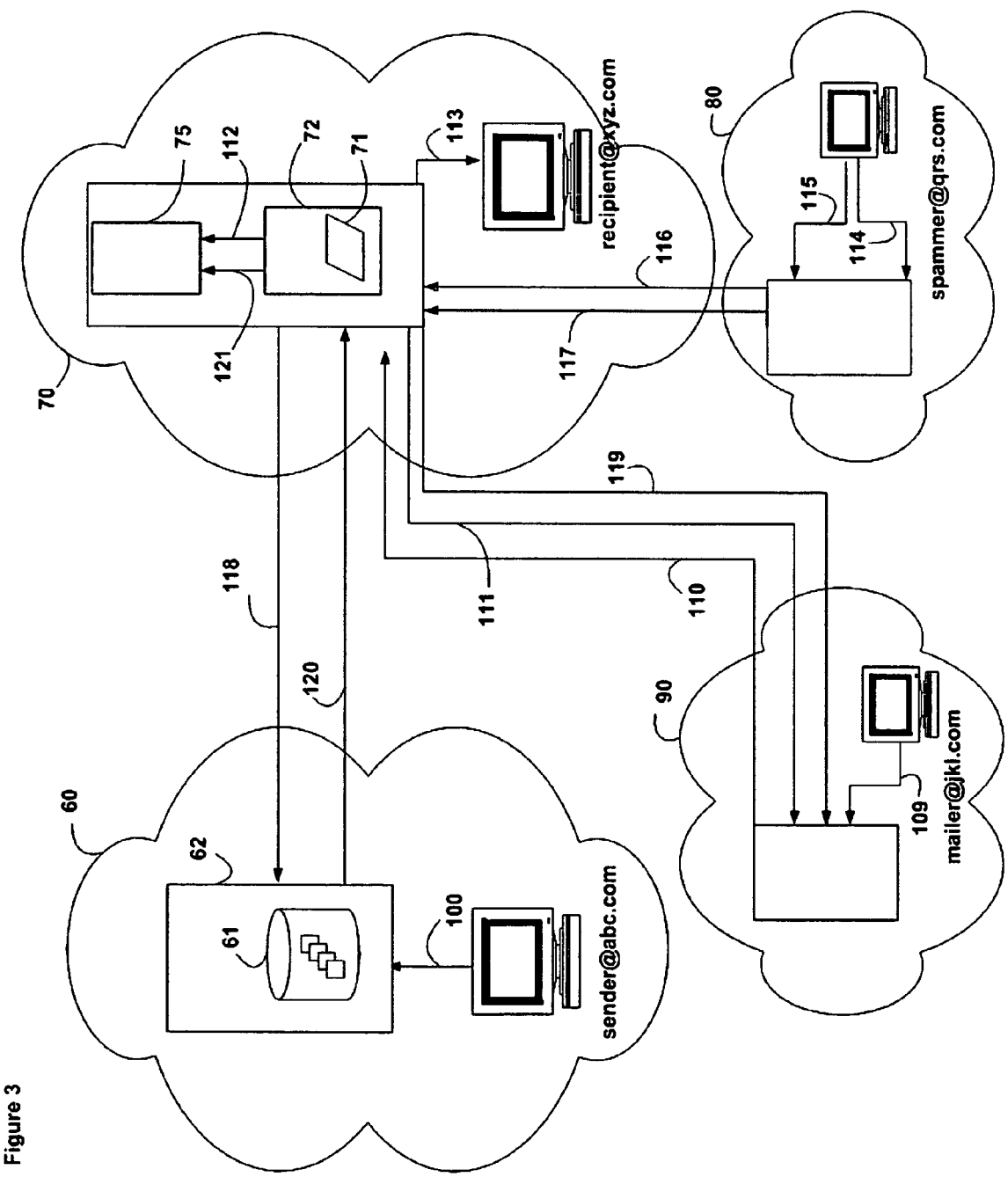
FIG. 3 is a schematic illustration of plural Sending Email Systems and a Receiving Email System processing and filtering spam emails according to the invention and in conjunction with a spam filter.

The invention may also be practiced in combination with one or more alternate methods for detecting and filtering Spam e-mail. FIG. 3 illustrates a preferred embodiment of the invention in operation in conjunction with a Spam filter. A Spamming Email System (80) is disposed to transmit Spam email messages. A Sending Email System (60) servicing the domain name abc.com is disposed to transmit email messages prepared by users with email addresses including the domain name abc.com. The Sending Email System (60) includes a Sending Module (62). The Sending Module (62) comprises an Information Record database (61).

A Receiving Email System (70) servicing the domain name xyz.com is disposed to receive and deliver email messages to users with email addresses including the domain name xyz.com. The Receiving Email System (70) includes a Receiving Module (72) and a Spam filter module (75) disposed to parse and analyze suspect email messages according to one or more algorithms.

A second Sending Email System (90) servicing the domain name jkl.com is disposed to transmit email messages prepared by users with email addresses including the domain name, jkl.com.

Referring to FIG. 3, the second Sending Email System (90) receives an email message (109) prepared by user mailer@jkl.com to be transmitted to recipient at email address recipient@xyz.com. The sender's email address and the recipients' email address appear in the header portion of the email message. Additionally, the time and date the message was prepared is presented in the header of the email.

The email message is transmitted (110) by the Sending Email System via standard and well-known methods to the Receiving Email System (70) of the intended recipient. When the Receiving Email System (70) receives the email message or the suspect email, the Receiving Module (72) temporary suspends delivery of the suspect email by routing the suspect email into a temporary hold queue (71) while it performs the confirmation process.

During the confirmation process, the Receiving Module (72) first determines the domain name for the originating email address from the message header of the suspect email. Next, the Receiving Module (72) prepares a confirmation request and transmits it (111) to the domain identified as the source of the suspect email message. The confirmation request contains data which uniquely identifies the suspect email and which by pre-arrangement, corresponds to the data used by Sending Modules practicing the invention in the communications network to uniquely identify email messages. Preferably this data includes the date and time the suspect email was prepared, the email address of the originator and the email addresses of the intended recipients of the email. Because the second Sending Email System (90) is not practicing the invention, the second Sending Email System (90) does not reply to the confirmation request.

Preferably, the confirmation request is transmitted to the Sending Email System (90) via port to port transmission over a port which by pre-arrangement has been designated for the communication of confirmation requests by Sending Email Systems practicing the invention in the communication network. When the Receiving Module (72) fails to communicate with the Sending Email System (90) or fails to receive an appropriate response to the confirmation request from the Sending Email System (90), the Receiving Module (72) removes the suspect email from the temporary hold queue (71) and forwards (112) the suspect email to the Spam filter module (75) for parsing and analysis.

The Spam filter module (75) processes the suspect email according to one or more Spam detection methods. When the Spam filter module (75) determines that the suspect email is not Spam email, the message is made available for delivery (113) to the intended recipient at recipient@xyz.com.

Similarly and again referring to FIG. 3, a Spammer at email address spammer@qrs.com prepares two Spam email messages to be sent to recipient at email address recipient@xyz.com. In order to avoid detection, the Spammer inserts a false origination address, sender@abc.com, in the header of the first Spam email message and sends it (114) to the Spamming Email System (80). The Spammer inserts a second false origination address, mailer@jkl.com, in the header of the second Spam email message and sends it (115) to the Spamming Email System. In addition to the false origination addresses, the recipients' email addresses and the date and time the email messages were prepared also appear in the header portion of the Spam email messages.

The first Spam email message is transmitted (116) by the Spamming Email System via standard and well-known methods to the Receiving Email System (70) of the intended recipient. When the Receiving Email System (70) receives the first Spam email message or the first suspect Spam email, the Receiving Module (72) temporary suspends delivery of the first suspect Spam email by routing the first suspect Spam email into the temporary hold queue (71) while it performs the confirmation process. Similarly, the second Spam email message is transmitted (117) by the Spamming Email System via standard and well-known methods to the Receiving Email System (70) of the intended recipient. When the Receiving Email System receives the second Spam email message or the second suspect Spam email, the Receiving Module (72) temporary suspends delivery of the second suspect Spam email by routing the second suspect Spam email into the temporary hold queue (71) while it performs the confirmation process.

During the confirmation process, the Receiving Module (72) first determines the domain names for the originating email addresses from the message headers of the first and second suspect Spam emails. Because the Spammer has falsely provided sender@abc.com as the originating email address for the first suspect Spam email and mailer@jkl.com as the originating email address for the second suspect Spam email, the Receiving Module (72) will determine that abc.com is the domain name of the originating domain for the first suspect Spam email and that jkl.com is the domain name of the second suspect Spam email.

Next, the Receiving Module (72) prepares a first confirmation request and transmits it (118) to the Sending Email System (60) servicing the domain, abc.com, which is identified as the source of the first suspect Spam email. The first confirmation request contains data which uniquely identifies the first suspect Spam email and which by pre-arrangement, corresponds to the data used by Sending Modules practicing the invention in the communications network to uniquely identify email messages. Preferably this data includes the date and time the first suspect Spam email was prepared, the email address of the purported originator of the message and the email addresses of the intended recipients of the email.

The Receiving Module (72) also prepares a second confirmation request and transmits it (119) to the Sending Email System (90) servicing the domain, jkl.com, which is identified as the source of the second suspect Spam email. The second confirmation request contains data which uniquely identifies the second suspect Spam email and which by pre-arrangement, corresponds to the data used by Sending Modules practicing the invention in the communications network to uniquely identify email messages. Preferably this data includes the date and time the second suspect Spam email was prepared and the email address of the purported originator of the message and the addresses of the intended recipients of the email.

When the first confirmation request is received by the Sending Email System (60) servicing the domain, abc.com, the Sending Email System communicates the request to the Sending Module (62). The Sending Module (62) compares the data submitted in the first confirmation request with the Information Records stored in its Information Record database (61). When the Sending Module fails to locate an Information Record prepared for the email corresponding to the data submitted in the confirmation request, the Sending Module (62) replies to the first confirmation request with a denial (120) that the Sending Email System (60) servicing abc.com sent the suspect email.

When the Receiving Module receives a reply to the confirmation request that denies that the Sending Email System sent the first suspect Spam email, the Receiving Module (72) destroys the first suspect Spam email message or otherwise disposes of it according to the preferences of the administrator of the Receiving Email System.

Preferably, the confirmation request and the reply to the confirmation request are transmitted to the via port to port transmission over a port which by pre-arrangement has been designated for the communication of confirmation requests by Receiving and Sending Email Systems practicing the invention in the communication network.

Since the Sending Email System (90) servicing the domain jkl.com is not practicing the invention, the Receiving Email System (70) will either not be able to communicate via the designated port with the Sending Email System (90) or it will fail to receive an appropriate response to the confirmation request. When the Receiving Module (72) fails to communicate with the Sending Email System (90) or fails to receive an appropriate response to the confirmation request from the Sending Email System (90), the Receiving Module (72) removes the suspect email from the temporary hold queue (71) and forwards (121) the suspect email to the Spam filter module (75) for parsing and analysis. The Spam filter module (75) processes the second suspect email message according to one or more Spam detection methods. When the Spam filter module (75) determines that the suspect email is Spam email, the Spam filter module (75) destroys the second suspect Spam email message or otherwise disposes of it according to the preferences of the administrator of the Receiving Email System.

Those skilled in the art will recognize that where a Sending Email System comprises a plurality of email servers servicing a single domain name, the Sending Module for the Sending Email System may comprise a centralized Information Record database in communication with each of the Sending Email System's email servers. In this circumstance each of the email servers of the Sending Email System will extract the data necessary to compile an Information Record from each email sent by the server. This data is communicated to the centralized Information Record database.

Similarly, when a confirmation request is received from a Receiving Email System, the Sending Email System will forward the request to the centralized Information Record database and the Sending Module will compare the data in the confirmation request with the data in the centralized Information Record database to determine whether the email corresponding to the confirmation request was transmitted by one of the email servers in the Sending Email System. When the Sending Module confirms that an Information Record prepared for the email message exists in the database it will reply in the affirmative and when the Sending Module fails to locate an Information Record prepared for the email message it will reply with a denial that the Sending Email System transmitted the email message corresponding to the data in the confirmation request.

Figure 4:
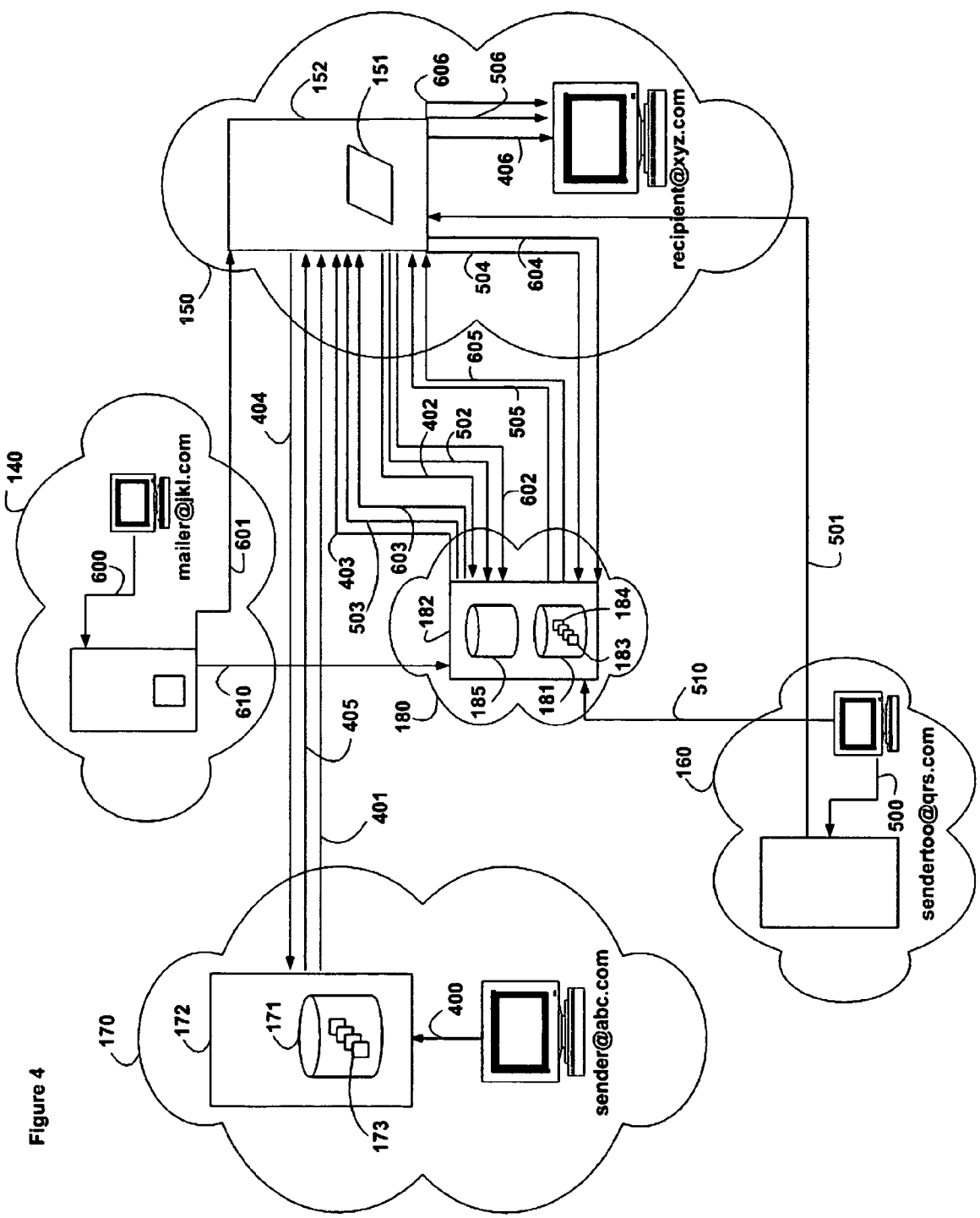
FIG. 4 is a schematic illustration of plural Sending Email Systems and a Receiving Email System processing email according to the invention and in which a centralized Confirming Email System is utilized by one Sending Email System and one client user.

In the embodiments illustrated thus far, the Sending Module is an integral part of a Sending Email System although the functions of the Sending Module may be distributed among a plurality of computers within the Sending Email System. Those skilled in the art will also recognize that the Sending Module functions may also be performed by a Confirming Email System operating independent from the Sending and Receiving Email Systems. FIG. 4. depicts an electronic communication network in which some of the Sending Email Systems in the network are practicing the invention. By pre-arrangement within the communication network, for confirmation purposes, each Sending Email System practicing the invention identifies each email sent by specified identification data. Preferably this data includes the sender's email address, the email addresses of the intended recipients and the date and time the email was prepared and an Identification Data String. The Identification Data String may be a data string prepared by an algorithm such as a checksum of the message text.

Referring to FIG. 4, a Sending Email System (170) servicing the domain name abc.com is disposed to transmit email messages prepared by users with email addresses including the domain name abc.com. The Sending Email System (170) includes a Sending Module (172). The Sending Module (172) comprises an Information Record database (171).

A Receiving Email System (150) servicing the domain name xyz.com is disposed to receive and deliver email messages to users with email addresses including the domain name xyz.com. The Receiving Email System (150) is in communication with a Receiving Module (152).

A Confirming Email System (180) is disposed to receive electronic communications, including email messages, and comprises a Centralized Sending Module (182). The Centralized Sending Module includes a Centralized Information Record database (181) and a Centralized Serviced Name Registry (185). The Centralized Serviced Name Registry includes a record of each domain name utilizing the Confirming Email System (180), as well as the email address of any domain name client utilizing the Confirming Email System for the confirmation of suspect emails.

A second Sending Email System (140) servicing the domain name jkl.com is disposed to transmit email messages prepared by users with email addresses including the domain name jkl.com. The second Sending Email System (140) is in communication with the Confirming Email System (180).

A third Sending Email System (160) servicing the domain name qrs.com is disposed to transmit email messages prepared by users with email addresses including the domain name, qrs.com.

Referring to FIG. 4, the first Sending Email System (170) receives an email message (400) prepared by user with the email address sender@abc.com to be transmitted to a recipient with the email address recipient@xyz.com. Consistent with RFC 2822, "Internet Message Format", the sender's email address and the recipient's email address appear in the header portion of the email message at the header fields "From:" and "To" respectively. Additionally and also consistent with RFC 2822, the date and time which the message was prepared is inserted at the header "Date:".

Prior to the transmission of the prepared email message, the Sending Module (172) of the first Sending Email System generates an Information Record (173) containing the specified identification data for the email consistent with the pre-arrangement within the network regarding the data used to identify emails for confirmation purposes. The Information Record (173) is stored by the Sending Module (172) in an Information Record database (171). The database is organized for efficient search and retrieval of the Information Records.

The second Sending Email System (140) receives an email message (600) prepared by user with the email address mailer@jkl.com to be sent to a recipient with the email address recipient@xyz.com. Consistent with RFC 2822, "Internet Message Format", the sender's email address and the recipients' email address appear in the header portion of the email message at the header fields "From:" and "To" respectively. Additionally and also consistent with RFC 2822, the date and time which the message was prepared is inserted at the header "Date:".

Prior to the transmission (601) of the prepared email message to the Receiving Email System, the second Sending Email System (140) extracts the data from the email message necessary to compile an Information Record containing the specified identification data for the email consistent with the pre-arrangement within the network regarding the data used to identify emails for confirmation purposes. The second Sending Email System (140) communicates the data (610) to the Confirming Email System (180). This communication is, preferably, performed by port to port communication between the second Sending Email System (140) and the Confirming Email System (180).

The Confirming Email System communicates the data to the Centralized Sending Module (182) which generates an Information Record (183) containing the specified identification data for the email consistent with the pre-arrangement within the network regarding the data used to identify emails for confirmation purposes.

The third Sending Email System (160) receives an email message (500) prepared by user with the email address sendertoo@qrs.com to be sent to a recipient with the email address recipient@xyz.com. Consistent with RFC 2822, "Internet Message Format", the sender's email address and the recipients' email address appear in the header portion of the email message at the header fields "From:" and "To" respectively. Additionally and also consistent with RFC 2822, the date and time which the message was prepared is inserted at the header "Date:" The user with the email address sendertoo@qrs.com also sends (510) a copy of the email message to the Centralized Communication System (180).

Although the third Sending Email System (160) is not practicing the invention, the client machine for sendertoo@qrs.com transmits a copy of the email message to the Confirming Email System (180) so that confirmation may be conducted by the Confirming Email System (180). Those skilled in the art will recognize that this may be accomplished simply by identifying an email address for the Confirming Email System (180) as a cc: or bcc: recipient of the email message.

Upon receipt of the email message sent by sendertoo@qrs.com, the Centralized Sending Module (182) of the Centralized Communication System generates an Information Record (184) containing the specified identification data for the email consistent with the pre-arrangement within the network regarding the data used to identify emails for confirmation purposes.

The Information Record (183) prepared for the email message sent by mailer@jkl.com and the Information Record (184) prepared for the email message sent by sendertoo@qrs.com are stored by the Centralized Sending Module (182) in an Information Record database (181). The database is organized for efficient search and retrieval of the Information Records.

The first (401), second (601) and third (501) email messages are transmitted by the first (170), second (140) and third (160) Sending Email Systems via standard and well-known methods to the Receiving Email System (150) of the intended recipient. When the Receiving Email System (150) receives the first (401) second (601), and third (501) suspect emails, the Receiving Module (152) temporary withholds delivery of each of the suspect emails by routing each suspect email into a temporary hold queue (151) while it performs the confirmation process.

During the confirmation process, the Receiving Module (152) first transmits a Confirmation Source Request to the Centralized Sending Module (182) for each of the suspect emails. The Confirmation Source Request for each email contains data identifying the purported sender of each suspect email. Preferably the Confirmation Source Request includes the email address of the purported sender for each suspect email. The Confirmation Source Request for the first suspect email (402) includes data identifying sender@abc.com as the purported sender, the Confirmation Source Request for the second suspect email (602) includes mailer@jkl.com as the purported sender and the Confirmation Source Request for the third suspect email (502) includes sendertoo@qrs.com as the purported sender. Upon receipt of each Confirmation Source Request, the Confirming Email System (180) compares the data identifying the purported sender with data in the records of the Centralized Serviced Name Registry (185) to determine whether the Confirming Email System (180) performs confirmation functions for the user or domain identified by each Confirmation Source Request.

When the Confirming Email System fails to identify a record in the Centralized Serviced Name Registry corresponding to the purported sender in the first Confirmation Source Request, the Confirming Email System replies (403) to the first Confirmation Source Request with a denial that it can confirm the first suspect email. When the Confirming Email System identifies a record in the Centralized Serviced Name Registry corresponding to the purported sender in the second and third Confirmation Source Requests, the Confirming Email System replies to each request (603 and 503) with an affirmation that it may perform a confirmation.

Upon receipt of the first reply (403) from the Confirming Email System denying that the Confirming Email System (180) may perform a confirmation for the first suspect email, the Receiving Module (152) determines the domain name for the originating email address from the message header of the first suspect email. Next, the Receiving Module (122) prepares and transmits a first Confirmation Request (404) corresponding to the first suspect email (401) and transmits the first Confirmation Request to the Sending Email System associated with the domain name identified as the source of the suspect email message, that is, the first Sending Email System (170). The first Confirmation Request contains the specified identification data for the first suspect email consistent with the pre-arrangement within the network regarding the data used to identify emails for confirmation purposes.

Upon receipt of the second and third replies (503 and 603) from the Confirming Email System affirming that the Confirming Email System can perform confirmation for the second and third suspect emails, the Receiving Module (122) prepares and transmits a second Confirmation Request (604) corresponding to the second suspect email (601) to the Confirming Email System (180) and prepares and transmits a third Confirmation Request (504) corresponding to the third suspect email (501) to the Confirming Email System (180). The second and third Confirmation Requests contain the specified identification data for the second and third suspect email respectively consistent with the pre-arrangement within the network regarding the data used to identify emails for confirmation purposes.

When the first Confirmation Request (404) is received by the first Sending Email System (170) the Sending Email System communicates the request to the Sending Module (172). The Sending Module (172) compares the data submitted in the first Confirmation Request with the Information Records stored in its Information Record database (171). When the Sending Module locates an Information Record (173) prepared for the email identified by the identification data submitted in the first Confirmation Request, the Sending Module (172) replies to the first Confirmation Request with an affirmation (405) that the first Sending Email System (170) sent the first suspect email.

When the Receiving Module receives the affirmation reply (405) to the first Confirmation Request (404) that affirms that the first Sending Email System (170) sent the first suspect email, the email is withdrawn from the temporary hold box (151) and made available for delivery (406) to the recipient at the address recipient@xyz.com by the Receiving Email System (150).

When the second Confirmation Request (604) is received by the Confirming Email System (180), the Confirming Email System communicates the request to the Centralized Sending Module (182). Similarly, when the third Confirmation Request (504) is received by the Confirming Email System (180), the Confirming Email System communicates the request to the Centralized Sending Module (182).

The Centralized Sending Module (182) compares the data submitted in the second Confirmation Request with the Information Records stored in its Information Record database (181). When the Centralized Sending Module locates an Information Record (183) prepared for the email identified by the identification data submitted in the second confirmation request, the Centralized Sending Module (182) replies to the confirmation request with an affirmation (605) confirming the authenticity of the second suspect email.

In like fashion, the Centralized Sending Module (182) compares the data submitted in the third Confirmation Request with the Information Records stored in its Information Record database (181). When the Centralized Sending Module locates an Information Record (184) prepared for the email identified by the identification data submitted in the third confirmation request, the Centralized Sending Module (182) replies to the confirmation request with an affirmation (505) confirming the authenticity of the third suspect email.

When the Receiving Module receives a reply to the second confirmation request confirming the authenticity of the second suspect email, the email is withdrawn from the temporary hold queue (151) and made available for delivery (606) to the recipient at the address recipient@xyz.com by the Receiving Email System (150). When the Receiving Module receives a reply to the third Confirmation Request confirming the authenticity of the third suspect email, the email is withdrawn from the temporary hold queue (151) and made available for delivery (506) to the recipient at the address recipient@xyz.com by the Receiving Email System (150).

Preferably, the communications between the Receiving Email System and the Confirming Email System are conducted via port to port communications. Further, those skilled in the art will recognize that the Receiving Email System may maintain a database of the email addresses and domains serviced by the Confirming Email System and may refer to this database in order to determine whether to make a Confirmation Request of the Confirming Email System or of the Sending Email System hosting the domain name of the purported sender. Further, where there is a plurality of Confirming Email Systems operating in a communications network, the database maintained by the Receiving Email System may identify the specific Confirming Email System performing confirmation functions for the purported sender. Alternatively, a consolidated Centralized Serviced Name Registry may provide a comprehensive database identifying the specific Confirming Email System for purported senders.

While the invention has been described in reference to certain preferred embodiments, it will be readily apparent to one of ordinary skill in the art that certain modifications or variations may be made to the system without departing from the scope of invention claimed below and described in the foregoing specification

I claim:

1. A method comprising:
  generating, from at least a portion of a first electronic message for an intended recipient, first identification data that uniquely identifies said first electronic message;
    associating said first identification data with said first electronic message;
    storing said first identification data;
    sending to said intended recipient said first electronic message with said first identification data;
    receiving on behalf of said intended recipient a first confirmation request including said first identification data and requesting confirmation that said first electronic message was authorized by said originator;
    comparing said first identification data received in said first confirmation request to said first stored identification data;
    upon determining that said first identification data received in said first confirmation request matches said first stored identification data, responding to said first confirmation request, affirming said first electronic message was authorized by said originator;
    generating, from at least a portion of a subsequent electronic message for said intended recipient, subsequent identification data that uniquely identifies said subsequent electronic message and distinguishes said subsequent electronic message from other electronic message authorized by said originator for said intended recipient;
    associating said subsequent identification data with said subsequent electronic message;
    storing said subsequent identification data;
    sending to said intended recipient said subsequent electronic message with said subsequent identification data;
    receiving on behalf of said intended recipient a subsequent confirmation request including said subsequent identification data and requesting confirmation that said subsequent, electronic message was authorized by said originator;
    comparing said subsequent identification data received in said subsequent confirmation request to said subsequent stored identification data; and
    upon determining that said subsequent identification data received in said subsequent confirmation request matches said stored subsequent identification data, responding to said subsequent confirmation request, affirming said subsequent electronic message was authorized by said originator.

2. The method of claim 1, wherein each of said first electronic message and said subsequent electronic message includes one of a text message, VoIP message, or instant message.

3. The method of claim 1, wherein each of said first identification data and said subsequent identification data is derived at least in part: from information contained in one or more of a message header, a message text, and a timestamp, of said first electronic message or said subsequent electronic message, respectively.

4. The method of claim 1, wherein said first identification data and said subsequent identification data is included in a message header of said first electronic message and said subsequent electronic message, respectively.

5. The method of claim 1, wherein said sending includes attaching said first identification data and said subsequent identification data as an attachment to said first electronic message and said subsequent electronic message, respectively.

6. The method of claim 1, wherein said first identification data and said subsequent identification data is included a text of said first electronic message and said subsequent electronic message, respectively.

7. The method of claim 1, further comprising:
    calculating a checksum for a text of said first electronic message and said subsequent electronic message, respectively; and
    including said checksum in said first identification data and said subsequent identification data, respectively.

8. The method of claim 1, wherein said receiving a first confirmation request includes receiving said first confirmation request via port-to-port communication; and
    wherein said receiving a subsequent confirmation request includes receiving said subsequent confirmation request via port-to-port communication.

9. The method of claim 1, wherein said receiving a first confirmation request includes receiving a first confirming electronic message; and
    wherein said receiving said subsequent confirmation request includes receiving a subsequent confirming electronic message.

10. The method of claim 9, wherein each of said first or subsequent confirming electronic messages includes one of a text message, VoIP message, or instant message.

11. The method of claim 1, wherein said responding to each of said first or subsequent confirmation request includes responding via port-to-port communication.

12. The method of: claim 1, wherein said responding to each of said first or subsequent confirmation request includes responding with a return electronic message.

13. The method of claim 12, wherein each of said first or subsequent return electronic messages is one of a text message, VoIP message, or instant message.

14. The method of claim 1, wherein said comparing is performed at a device different from a device at which said associating is performed.

15. The method of claim 1, wherein; said comparing is performed at a device different from a device at which said sending is performed.

16. The method of claim 1, wherein each of said first or subsequent identification data is an alphanumeric string.

17. A system comprising:
    a computer comprising a sending module operable to:
        send to an intended recipient at least a first and a subsequent electronic message authorized by an originator and first and subsequent identification data uniquely identifying said first and subsequent electronic messages, the first and subsequent identification data distinguishing said first and subsequent electronic messages from other electronic messages authorized by the originator, said first and subsequent identification data being stored for subsequent access, said first and subsequent identification data being generated from at least a portion of the first and subsequent electronic messages;
        receive on behalf of the intended recipient first and subsequent confirmation requests including said first and subsequent identification data and requesting confirmation that said first and subsequent electronic messages were authorized by the originator;
        compare said first and subsequent identification data received in said first and subsequent confirmation requests to said stored first and subsequent identification data; and
        upon determining that said first and subsequent identification data received in said first and subsequent confirmation requests match said first and subsequent stored identification data, respond to said first and second confirmation requests, affirming said first and subsequent electronic messages were authorized by the originator.

18. The system of claim 17, wherein said sending module is operable to send to the intended recipient said first and subsequent electronic messages that include one of a text message, VoIP message, or instant message.

19. The system of claim 17, wherein said first and subsequent identification data was generated from information contained in one or more of a message header, a message text, and a timestamp, of said first and subsequent electronic messages.

20. The system of claim 17, wherein said first and subsequent identification data is an alphanumeric string.

21. The system of claim 17, wherein said first and subsequent identification data is included in a message header of said first and subsequent electronic messages.

22. The system of claim 17, wherein said first and subsequent identification data is included in a message text of said first and subsequent electronic messages.

23. The system of claim 17, wherein said sending includes attaching said first and subsequent identification data as an attachment to said first and subsequent electronic messages.

24. The system of claim 17, further comprising:
calculating a checksum for a text of said first and subsequent electronic messages; and
including said checksum in said first and subsequent identification data.

25. The system of claim 17, wherein said confirmation module is operable to receive said first and subsequent confirmation requests via port-to-port communication.

26. The system of claim 17, wherein said confirmation module is operable to respond to said first and subsequent confirmation requests via port-to-port communication.

27. The system of claim 17, wherein said confirmation module is operable to receive said first and subsequent confirmation requests as first and subsequent confirming electronic messages.

28. The system of claim 27, wherein said first and subsequent confirming electronic messages are one of a text message, VoIP message, or instant message.

29. The system of claim 17, wherein said confirmation module is operable to respond to said first and subsequent confirmation requests with a return electronic message.

30. The system of claim 29, wherein said return electronic message is one of a text message, VoIP message, or instant message.

31. A method comprising:
receiving a first confirmation request to confirm that first electronic message sent
to an intended recipient was authorized by an originator identified in the first electronic message, the first confirmation request including first identification data purporting to uniquely identify the first electronic message, the first identification data having been generated from at least a portion of the first electronic message;
searching a data store, separate from said first; electronic message, for said first identification data;
upon determining that said data store does not contain said first identification data, responding to said confirmation request, denying the first electronic message was authorized by the originator;
receiving a subsequent confirmation request to confirm that a subsequent electronic message sent to an intended recipient was authorized by the originator identified in the subsequent electronic message, the subsequent confirmation request including subsequent identification data purporting to uniquely identify the subsequent electronic message, the subsequent identification data distinguishing said subsequent electronic message from other electronic messages authorized by the originator, the subsequent identification data having been generated from at least a portion of the subsequent electronic message;
searching a data store, separate from said subsequent electronic message, for said subsequent identification data; and
upon determining that said data store does not contain said subsequent identification data, responding to said subsequent confirmation request, denying the subsequent electronic message was authorized by the originator.

32. The method of claim 31, wherein said receiving a confirmation request includes receiving said first and subsequent confirmation requests via port-to-port communication.

33. The method of claim 31, wherein said; responding to said first and subsequent confirmation requests includes responding via port-to-port communication.

34. The method of claim 31, wherein said receiving first and subsequent confirmation request includes receiving first and subsequent confirming electronic messages.

35. The method of claim 34, wherein said first and subsequent confirming electronic messages are one of a text message, VoIP message, or instant message.

36. The method of claim 31, wherein said responding to said first and subsequent confirmation requests includes responding with first and subsequent return electronic messages.

37. The method of claim 36, wherein said first and subsequent return electronic messages are one of a text message, VoIP message, or instant message.

38. A method comprising:
receiving a first confirmation request to confirm that a first electronic message sent to an intended recipient was authorized by an originator identified in the first electronic message, the first confirmation request including first identification data purporting to uniquely identify the first electronic message, the first identification data having been generated from at least a portion of the first electronic message;
searching a data store, independent of said first electronic message, for said first identification data;
upon determining that said data store contains said first identification data, responding to said first confirmation request, affirming the first electronic message was authorized by the originator;
receiving a subsequent confirmation request to confirm that a subsequent electronic message sent to an intended recipient was authorized by the originator identified in the subsequent electronic message, the subsequent confirmation request including subsequent identification data purporting to uniquely identify the subsequent electronic message, the, subsequent identification data distinguishing said subsequent electronic message from other electronic messages authorized by the originator, the subsequent identification data having been generated from at least a portion of the subsequent electronic message;
searching a data store, independent of said subsequent electronic message, for said subsequent identification data; and
upon determining that said data store contains said subsequent identification data, responding to said subsequent confirmation request, affirming the subsequent electronic message was authorized by the originator.

39. The method of claim 38, wherein said receiving first and subsequent confirmation requests includes receiving said first and subsequent confirmation requests via port-to-port communication.

40. The method of claim 38, wherein said responding to said first and subsequent confirmation requests includes responding via port-to-port communication.

41. The method of claim 38, wherein said receiving first and subsequent confirmation requests includes receiving first and subsequent confirming electronic messages.

42. The method of claim 41, wherein said first and subsequent confirming electronic messages are one of a text message, VoIP message, or instant message.

43. The method of claim 38, wherein said responding to said first and subsequent confirmation requests includes responding with first and subsequent return electronic messages.

44. The method of claim 43, wherein said first and subsequent return electronic message-is messages are one of a text message, VoIP message, or instant message.

45. A method comprising:
   receiving from a sending device a first electronic message authorized by an originator, said first electronic message containing first information identifying the originator, the first identifying information having been generated from at least a portion of the first electronic message;
   sending to a confirmation device a first confirmation request requesting confirmation that said first electronic message was authorized by the originator;
   searching a data store, independent of said first electronic message, for said first identification information;
   upon determining that said data store contains said first identification information responding to said first confirmation request, affirming the first electronic message was authorized by the originator;
   receiving a response to said first confirmation request affirming said first electronic message was authorized by the originator;
   allowing said first electronic message to be further processed according to rules for processing of confirmed electronic messages directed to the intended recipient;
   receiving from the sending device a second electronic message different from said first electronic message authorized by the originator, said second electronic message containing second information identifying the originator, the second identifying information having been generated from at least a portion of the second electronic message and distinguishing said second electronic message from other electronic messages authorized by the originator;
   sending to the confirmation device a second confirmation request requesting confirmation that said second electronic message was authorized by the originator;
   searching a data store, independent of said second electronic message, for said second identification information;
   upon determining that said data store contains said second identification information responding to said second confirmation request, affirming the second electronic message was authorized by the originator;
   receiving a response to said second confirmation request affirming said second electronic message was authorized by the originator; and
   allowing said second electronic message to be further processed according to rules for processing of confirmed electronic messages directed to the intended recipient.

46. The method of claim 45, wherein each of said first electronic message and said second electronic message includes one of a text message, VoIP message, or instant message.

47. The method of claim 45, wherein said sending to a confirmation device includes sending said first: confirmation request and said second confirmation request via port-to-port communication.

48. The method of claim 45, wherein said receiving a response includes receiving the response via port-to-port communication.

49. The method of claim 45, wherein each of said first confirmation request and said second confirmation request is a confirming electronic message.

50. The method of claim 49, wherein said confirming electronic message is one of a text message, VoIP message, or instant message.

51. The method of claim 45, wherein said response to said first confirmation is a return electronic message.

52. The method of claim 51, wherein said return electronic message is one of a text message, VoIP message, or instant message.

53. The method of claim 1, wherein:
   the associating, storing and sending are at a sending module of a sending email system; and
   the receiving, comparing and responding are at a confirmation module of the sending email system.

54. The method of claim 31, wherein the receiving, searching and responding are at a confirmation module of a sending email system.

55. The method of claim 38, wherein the receiving, searching and responding are at a confirmation module of a sending email system.

56. The method of claim 45, wherein receiving the first electronic message,
   sending the first confirmation request,
   receiving the response affirming said first electronic message was authorized by the originator,
   allowing said first electronic message to be further processed, receiving the second electronic message, and sending the: second confirmation request are at a receiving email system.

* * * * *